UNITED STATES PATENT OFFICE.

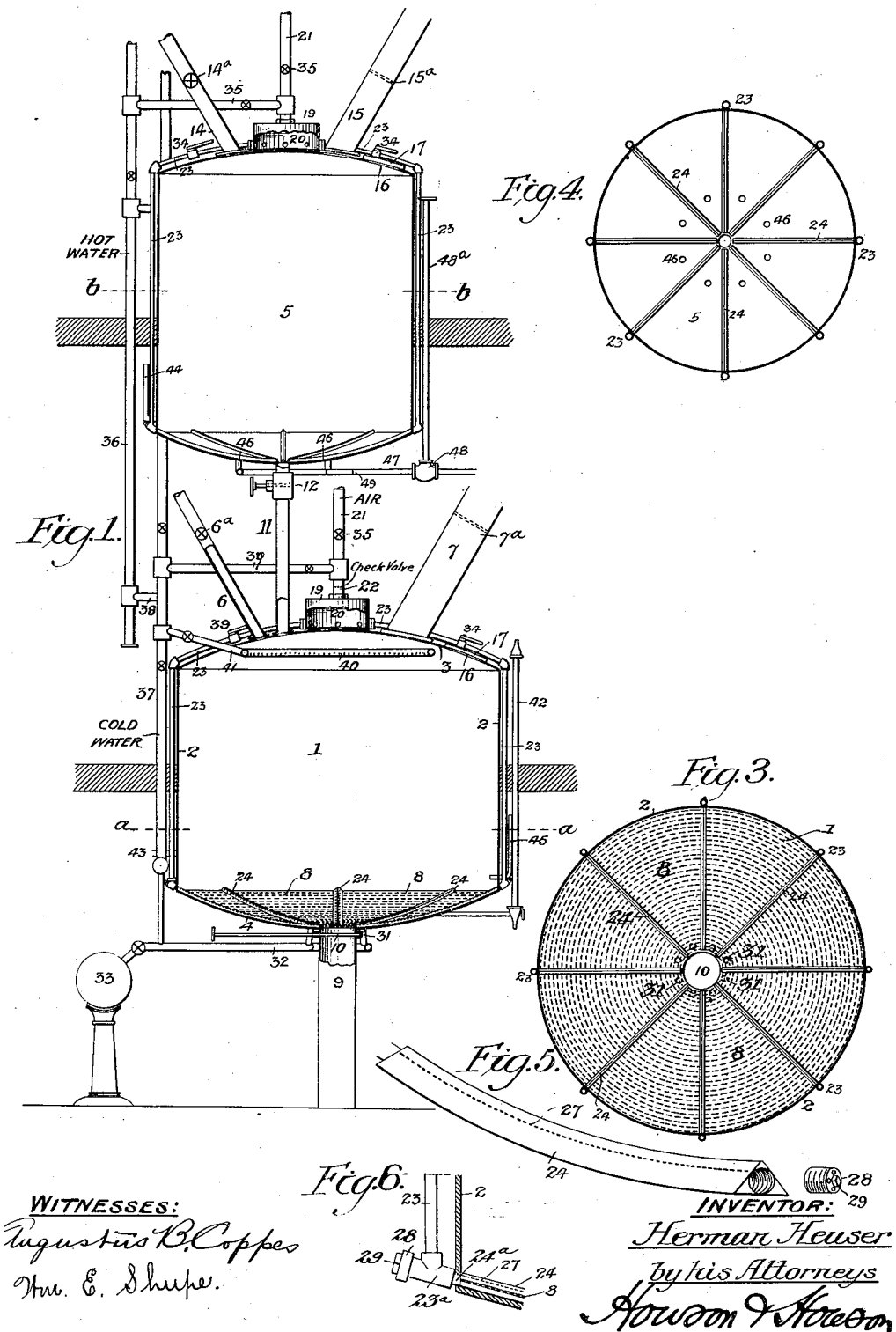

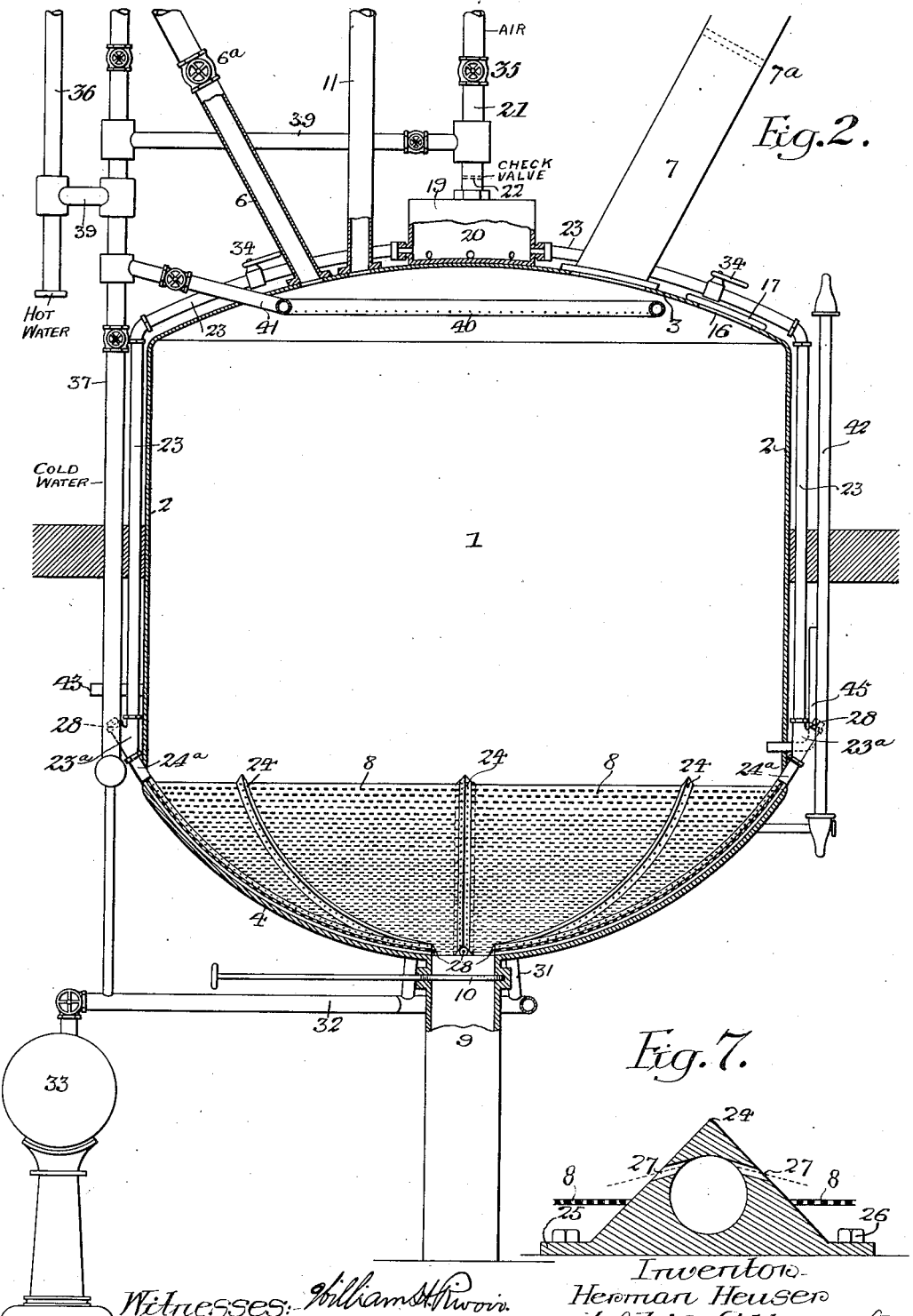

HERMAN HEUSER, OF SOUTH CHICAGO, ILLINOIS.

MASHING APPARATUS.

No. 861,979.  Specification of Letters Patent.  Patented July 30, 1907.

Application filed June 27, 1905. Serial No. 267,304.

*To all whom it may concern:*

Be it known that I, HERMAN HEUSER, a citizen of the United States, and a resident of South Chicago, Illinois, have invented certain Improvements in Mashing Apparatus, of which the following is a specification.

My invention relates to apparatus employed for the extraction of wort for use in the manufacture of beer, ale, porter, stout, malt extracts, diastastic extracts, as well as whisky, grain alcohol, yeast and vinegar; and consists of certain improvements in such apparatus designed to effect in a simpler and more effective manner than heretofore, the extraction of wort, for use in the manufacture of such products, from the material forming the mash.

My invention is fully shown in the accompanying drawings, in which:

Figure 1, is a vertical sectional view of a mash-tun and cooker embodying my invention; Fig. 2, is an enlarged vertical sectional view of the mash-tun; Fig. 3, is a sectional plan view of the mash-tun, taken on the line a—a, Fig. 1; Fig. 4, is a sectional plan view of the cooker, taken on the line b—b, Fig. 1, and Figs. 5, 6 and 7, are views illustrating details of my invention.

In the improved type of apparatus forming the subject of my invention, the mashing, that is to say, the mixing and stirring of the material from which the wort is subsequently extracted, may be done either in a single mashing apparatus, ordinarily termed a mash-tun, or it may be done in a duplex apparatus comprising a mash-tun and cooker; in which latter case, the material after being cooked in one part of the apparatus is transferred to the other part, or the mash-tun proper. In either instance the material may be wholly uncooked or cooked, or may be a combination of cooked and uncooked material.

In the drawings herewith, Fig. 1, shows a sectional elevation of the mash-tun and cooker, the latter being disposed above the mash-tun and in communication therewith, and Fig. 2, shows an enlarged sectional elevation of the mash-tun. 1 represents the mash-tun, in the present instance circular in cross-section, having a vertical wall 2, a convex top 3 and a concaved bottom 4. The cooker 5, mounted above the mash-tun, is preferably of a similar shape though somewhat smaller in diameter.

The mash-tun is provided at the top with a tube or spout 6 for the inlet of small grain or other material to be operated upon to form the mash, which pipe may be valved as indicated at 6ª; and with a pipe 7 for ventilation and the exit of vapor rising from the material within the mash-tun. The pipe 7 may also be valved as indicated at 7ª.

In the lower part of the mash-tun, I provide a false bottom or strainer made up of a series of perforated plates 8, and leading from the mash-tun is a discharge pipe 9 for the removal of spent grain or other material forming the mash, which discharge pipe is provided with a sliding cut-off valve 10.

The cooker 5 is mounted above the mash-tun, and a pipe 11, having a suitable cut-off valve 12, is provided for communication between these vessels. The cooker is provided with a tube or spout 14 for the introduction of material to be cooked prior to delivery into the mash-tun, which pipe may be valved as indicated at 14ª; and with a pipe 15 for ventilation and the escape of vapor. This latter pipe may also be valved as indicated at 15ª. Both vessels have manhole openings 16 closed by suitable covers 17.

Leading from the mash-tun, adjacent the central discharge opening in the bottom of the same, are a series of pipes 31 communicating with a receiving pipe 32 whereby the wort may be conveyed from the mash-tun to a grant 33.

In communication with the vessels 1 and 5, I provide means for discharging air under pressure to stir the material within the same, such air discharging means terminating in a series of perforated pipes located on the bottom of the mash-tun and cooker; each set of pipes being in communication with a central receiver carried at the top of the mash-tun and cooker, respectively.

The air distributing means are constructed and arranged as follows: Mounted at the top of the mash-tun is a casing 19 providing a receiving chamber 20 with which an air inlet pipe 21 from a suitable source of supply and having a check valve 22, communicates. From the casing 19 a series of pipes 23 extend, in the present instance eight in number, the upper portions of which pipes are disposed on top of the mash-tun. Extensions of these pipes are disposed vertically at substantially equi-distant points outside the wall of the mash-tuns, and these extensions are connected, by means of couplings 23ª, with special pipes 24 lying on the bottom of the mash-tun. The pipes 24 are triangular in cross-section as clearly shown in Figs. 1, 5 and 7, and they serve as supports for the plates 8 forming the strainer-like false-bottom. The pipes 24 are provided with side extensions or lugs 25 whereby they may be fastened to the bottom of the mash-tun by suitable means, such as bolts 26, and they are perforated on both sides at 27 as shown, such perforations being inclined slightly in a downward direction, as clearly seen in Fig. 7. Air under pressure discharged from these perforations will thoroughly agitate and stir the mass of grain or other material forming the mash and keep the same in a constant state of motion, thoroughly breaking up and separating the component parts of the mash and effecting a most satisfactory extraction of the wort.

When the plates 8 forming the strainer or false-bottom of the mash-tun are in position, only the upper portion of the perforated pipes 24 are visible, that is to say, as much as is needed to have the perforations, which point in a slightly downward direction over the false-bottom or strainer plates 8, as clearly shown in Fig. 7, sufficiently high as to make the discharge of air therefrom properly effective. This peculiar shape of the perforated pipes not only permits the ready placing of the false-bottom plates in a tight-fitting position, but also permits of an easy removal of these plates for the purpose of cleaning the same, or of getting at the bottom of the mash-tun for cleaning. The pipes 24 are securely fastened to the bottom of the mash-tun or bottom of cooker so that it is impossible for particles of grain or wort to settle under the same for future contamination, and by reason of their triangular shape the surface of these pipes can be easily cleaned. The pipes 24 are provided at each end with caps or plugs 28, which are removable for the insertion of a cleaning brush or the introduction of a cleansing fluid. The inner end of each pipe, which is also its lowest point, is closed by a well fitting plug which is perforated so that a portion of the air under pressure may discharge through the same into the center of the mash. The use of the perforated plugs insures further that all wort will drain out of the perforated pipes after the spent grain or other material has been removed, and also all water that may be used in cleansing the system. The caps or plugs closing the pipes 24 are provided with squared portions 29 so as to be readily removable by the aid of a suitable wrench. The pipes 24 have round ends 24ª which pass through the wall of the mash-tun as shown in Fig. 6, and are connected to the couplings 23ª. From these couplings the pipes 23 lead up the side wall and over the top of mash-tun to the casing 19 having the central air chamber 20. By this arrangement, the inside of the mash-tun and cooker is freed of all superfluous fittings, for the plainer the inside of cooking and mashing apparatus, the easier the cleaning of the structure after the cooking or mashing vessels are emptied.

The pipes 23 are provided with independent valves 34, as shown in Figs. 1 and 2, and by this means I am able, by closing all of such valves but one, to concentrate the entire air pressure on any single pipe disposed in any particular part of the mashing apparatus, if extra pressure should be needed at such point during mashing or the discharge of the spent grains or other material. The vertical portions of the pipes 23 leading from the central air chambers are preferably disposed outside the mash-tun or cooker, and their number may be increased or decreased as desired. By having a central air receptacle at the top of the vessels, the air is introduced to all points of the material undergoing treatment in said vessels with equal velocity and the efficiency of the air as a stirring medium is greatly increased.

The cooker is provided with means for discharging air into the material therein of precisely the same construction as that employed in connection with the mash-tun, and similar reference numerals are used in connection therewith. The action of the air under pressure discharged into the cooker from the pipes 24 therein is precisely the same as in the mash-tun, effectually stirring and breaking up the material forming the mash as it is cooked, and when such material is in proper shape it may be passed to the mash-tun through the pipe 11, the valve 12 being opened for the purpose. For controlling or regulating the supply of air passing to the chambers 20 of the mash-tun and cooker, I provide the pipes 21 with valves 35.

The discharge of the cooked mash from the cooker, or the spent grains from the mash-tun is a very simple matter and takes but little time. After the wort has been drained off from the mash, it is only necessary to open the spent grain valve 10 in the case of the mash-tun, or the valve 12 in the case of the cooker, and then after a few minutes to open the main air valves 35. By opening valves 10 and 12, the material above and near the discharge openings will be delivered first, and then by turning on the valves 35, the balance of the material will slide down and be discharged by the force of the air pressure.

My improved mashing apparatus is provided, as is common with all similar apparatus, with hot and cold water pipes 36 and 37, which may be connected by a pipe 38 as shown in Fig. 1; all of said pipes being provided with the usual valves. In order to cleanse the entire system of pipes conveying air to the material forming the mash in the several vessels, I provide pipes 39 connecting the pipes 21, from the source of air pressure and leading to the central air chambers, with the hot and cold water pipes 36 and 37, so that water may be passed through the pipes normally employed for air under pressure. During this action I may manipulate the valves 34 of the pipes 23 so as to concentrate the entire water pressure upon each pipe in succession in order to wash out any particle of grain or other material that may have settled in the perforations of the pipes 24. During the cleansing operation the caps or plugs at the extremities of the pipes 24 within the cooker and mash-tun are detached, permitting the insertion of a cleaning brush from the exterior of the structures.

The mash-tun is provided with the usual sparger 40 located near the top of said vessel and connected with the water pipe 37 by means of a pipe 41. By this means the material in the mash-tun may be sprayed with hot water to remove all of the extract remaining in the mash. The mash-tun is also provided with a gage 42, and as many steam inlets as may be desired, one of which is shown at 43, and both cooker and mash-tun have thermometers 44 and 45, respectively. The cooker is provided with a series of steam inlets 46 leading from a pipe 47 connected to a suitable source of supply; such pipe having a suitable controlling valve 48, which may be operated by a stem 48ª reaching to a convenient point, and a check-valve 49. In all other respects the preparation of the mash is carried on precisely as ordinarily done hitherto, and as soon as the material is placed in the mash-tun and cooker, the air under pressure is turned on and the mashing operation for the extraction of wort proceeds as in the usual manner.

As cleanliness and its ready accomplishment are of great importance in carrying out the process of mashing, I may mention the following points of advantage: My arrangement of the air discharging means with its branches from the central air receiving chambers, consists entirely of inclined and vertical pipes, the lower inclined pipes being perforated to their extremities. This makes it possible for every drop of wort to drain out of the pipes by gravity. For this reason the cleaning of the pipes is a very simple affair. In order to clean the pipes, it is only necessary to force hot and cold water through the same. At intervals the perforated pipes may have to undergo an extraordinary cleaning, which consists simply in removing the plugs and inserting a cleansing brush into the same, and the subsequent forcing of hot and cold water through each pipe in succession.
In the operation of my improved apparatus, whether in connection with the grain or other material undergoing a cooking operation in the vessel 5, or the mash proper undergoing treatment in the vessel 1 such as will secure the full and proper extraction of the wort, air under pressure is admitted to the chambers 20 of the casings 19, and from these chambers it passes, through the pipes 23, to the pipes 24 located on the bottom of the vessels 1 and 5, which pipes 24 are perforated in the manner clearly indicated in the drawings, so that a complete stirring action may be imparted by the air under pressure to the material undergoing treatment in said vessels. When such treatment is completed, the air under pressure having, on the one hand, kept the material in the vessel 5 properly stirred up so as to insure complete cooking by the steam admitted and on the other hand, kept the mash in the vessel 1 in such a constant state of agitation as to permit a full and free separation or extraction of the wort, the contents of said vessels are to be discharged. In the case of the cooker, the material therein passes to the mash-tun, and in the case of the mash-tun, the material therein, after the extraction of the wort, being in a spent condition, is to be discharged to waste. In each instance, such material is discharged through pipes leading from the bottom of the vessels, and in each instance the air is turned on to assist such discharge. After the vessels have been discharged of the greater quantity of the heavier material therein they are to be washed, and this is simply done by cutting off the communication of the air with the chambers 20, and connecting the pipes 21 leading thereto with the water pipes. By this means water is discharged into the vessels, either hot or cold, washing out the same thoroughly and preparing them for further use.
If desired or necessary, cleaning brushes may be inserted in the perforated pipes 34, as previously described.

I claim:

1. The combination in a mashing apparatus, of a receptacle for the material forming the mash, a source of air supply, a central chamber receiving such air supply and mounted on top of the mash receptacle, and a series of pipes radiating from said central chamber exterior of said receptacle and having perforated portions extending through the walls of said receptacle and disposed on the bottom of the same.

2. The combination in a mashing apparatus, of a receptacle for the material forming the mash, a source of air supply, a central chamber mounted on top of the mash receptacle and in communication with said air supply, a series of pipes radiating from said central chamber, a series of perforated pipes disposed radially on the bottom of said mash receptacle and secured thereto, and vertical pipes disposed against the outer wall of the mash receptacle and connecting said sets of pipes.

3. The combination in a mashing apparatus, of a receptacle containing the material, forming the mash, an air chamber mounted on top of said receptacle, a source of air supply communicating therewith, a series of pipes radiating from said chamber, a series of perforated pipes communicating therewith and disposed on the bottom of said receptacle, and detachable caps or plugs for the ends of said perforated pipes whereby cleaning means may be introduced into said pipes after the caps or plugs have been removed.

4. The combination in a mashing apparatus, of the mash-tun, a source of air supply, a chamber mounted on top of the mash-tun and communicating with said air supply, a series of pipes radiating from said chamber exterior of the mash-tun and having perforated portions extending through the walls of the latter and disposed on the bottom of the mash-tun, and a perforated bottom forming a strainer supported by said pipes below the perforations of the same.

5. The combination in an apparatus for producing mash from grain or other suitable material, of a vessel for containing the mash, a source of air supply, a central chamber mounted on top of the mash vessel and communicating with said air supply, and a series of discharge pipes radiating from said central chamber, said pipes having portions lying against the outer wall of the vessel and sections extending through the wall of said vessel and lying on the bottom of the same, said latter sections being provided with apertures whereby the air under pressure will be discharged at numerous points throughout the body of material within the vessel.

6. The combination in an apparatus for producing mash from grain or other suitable material, of a vessel for containing the material forming the mash, a source of air supply to act upon the mash within said vessel, a central chamber carried on top of said vessel communicating with the source of air supply, a series of discharge pipes radiating from said chamber, said pipes having portions lying against the outer wall of the vessel and sections extending through the wall of said vessel and lying on the bottom of the same, said latter sections being provided with apertures whereby the air under pressure will be discharged at numerous points throughout the body of material within the vessel, and hot and cold water pipes arranged wholly exterior of the mash vessel and adapted to be placed in communication with said air pipes for the purpose of cleansing the same and the vessel in which the perforated sections of pipes are contained.

7. The combination in a mashing apparatus, of a receptacle for the material forming the mash, a source of air supply, a chamber mounted on top of said receptacle and receiving such air supply, a series of pipes radiating from said chamber, and triangular perforated pipes connected to said exterior pipes and extending through the wall of said receptacle, said perforated pipes being disposed on the bottom of said receptacle and secured thereto.

8. The combination in a mashing apparatus, of a receptacle for the material forming the mash, a source of air supply, a chamber mounted on top of said receptacle and communicating with said air supply, a series of pipes radiating from said chamber exterior of said receptacle, a series of perforated pipes extending through the wall of the latter and connected to said exterior pipes, said perforated pipes being disposed at the bottom of said receptacle, and a series of removable strainer plates supported by said pipes and lying below the perforations of the same.

9. The combination in a mashing apparatus, of a receptacle for the material forming the mash, a series of pipes exterior of said receptacle, and perforated pipes connected to said exterior pipes and extending through the wall of said receptacle, said perforated pipes being disposed on the bottom of the latter and having their perforations disposed at an angle so that water discharged through the same will strike the bottom of the receptacle intermediate the pipes arranged thereon.

In testimony whereof, I have signed my name to this specification, in the presence of two subscribing witnesses.

HERMAN HEUSER.

Witnesses:
JOHN HARRIGMAN,
THOMAS KINNWMAN.